MONOSTABLE MULTIVIBRATOR HAVING FAST RECOVERY

Filed March 14, 1963

ROBERT JAMES SACHA
INVENTOR.

BY Arthur L. Bowers
AGENT

Max R. Farmer
ATTORNEY

United States Patent Office 3,303,353

Patented Feb. 7, 1967

3,303,353

MONOSTABLE MULTIVIBRATOR HAVING FAST RECOVERY

Robert James Sacha, Williamsville, N.Y., assignor, by mesne assignments, to the United States of America as represented by the Secretary of the Navy Filed Mar. 14, 1963, Ser. No. 265,298
1 Claim. (Cl. 307—88.5)

This invention relates in general to a monostable multivibrator circuit providing output pulses of improved waveform.

An object of this invention is to provide an improved monostable multivibrator capable of generating an output pulse having a fast recovery time on the trailing edge. A further object is to enable optimizing of circuit operating conditions without disturbing output pulse length or amplitude.

Other objects and advantages will appear from the following description of an example of the invention, and the novel featrues will be particularly pointed out in the appended claim.

Figure 1:
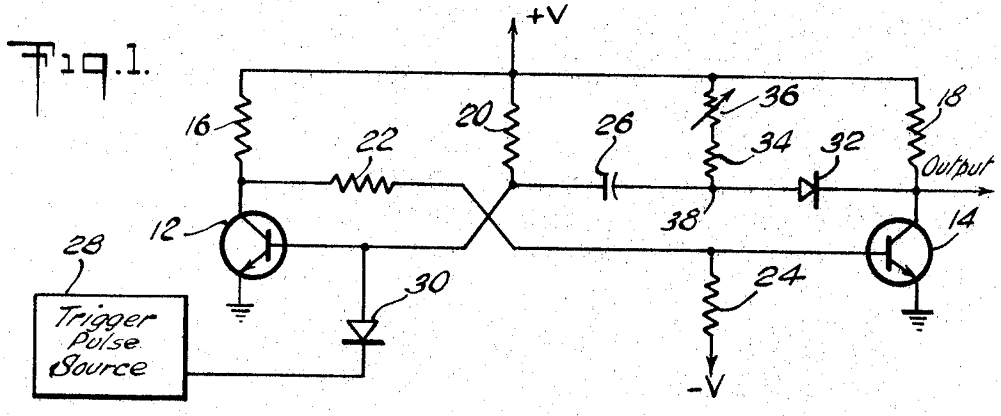

FIG. 1 is a schematic circuit diagram of an embodiment of this invention, and

FIGS. 2–6 inclusive illustrate graphically the potentials at several points in the circuit shown in FIG. 1 when triggered.

In FIG. 1, there is shown a monostable multivibrator circuit including two NPN transistors 12 and 14, collector resistors 16 and 18 for the respective transistors, a base resistor 20 for transistor 12, a base resistor 22 between the base of transistor 14 and the collector of transistor 12, a bias resistor 24 joined to the base of transistor 14, and a coupling capacitor 26 between the base of transistor 12 and the collector of transistor 14. A direct current power supply, not shown, establishes a potential +V on the free ends of the collector resistors 16 and 18 and the free end of base resistor 20 relative to the emitters of both transistors, and establishes a potential —V on the free end of bias resistor 24 relative to the emitters sufficient to cut off transistor 14. Circuit parameters are selected to permit saturation current through either transistor. A trigger pulse source 28 is coupled to the base of transistor 12 by a diode 30 joined at its anode to the base of the transistor 12 and at its cathode to the trigger pulse source. The trigger pulse source has an output potential between trigger pulses somewhat higher than the base-emitter voltage of transistor 12 at saturation and supplies trigger pulses of peak potential substantially below the emitter potential to cut off transistor 12.

A decoupling diode 32 is connected between coupling capacitor 26 and the collector of transistor 12 to virtually preclude any capacitor charging current flow through collector resistor 18. A charging resistor, including fixed resistor 34 and adjustable resistor 36, is connected between junction 38 of capacitor 26 and diode 32 and the +V power supply terminal.

Figures 2, 3, 4, 5, 6:
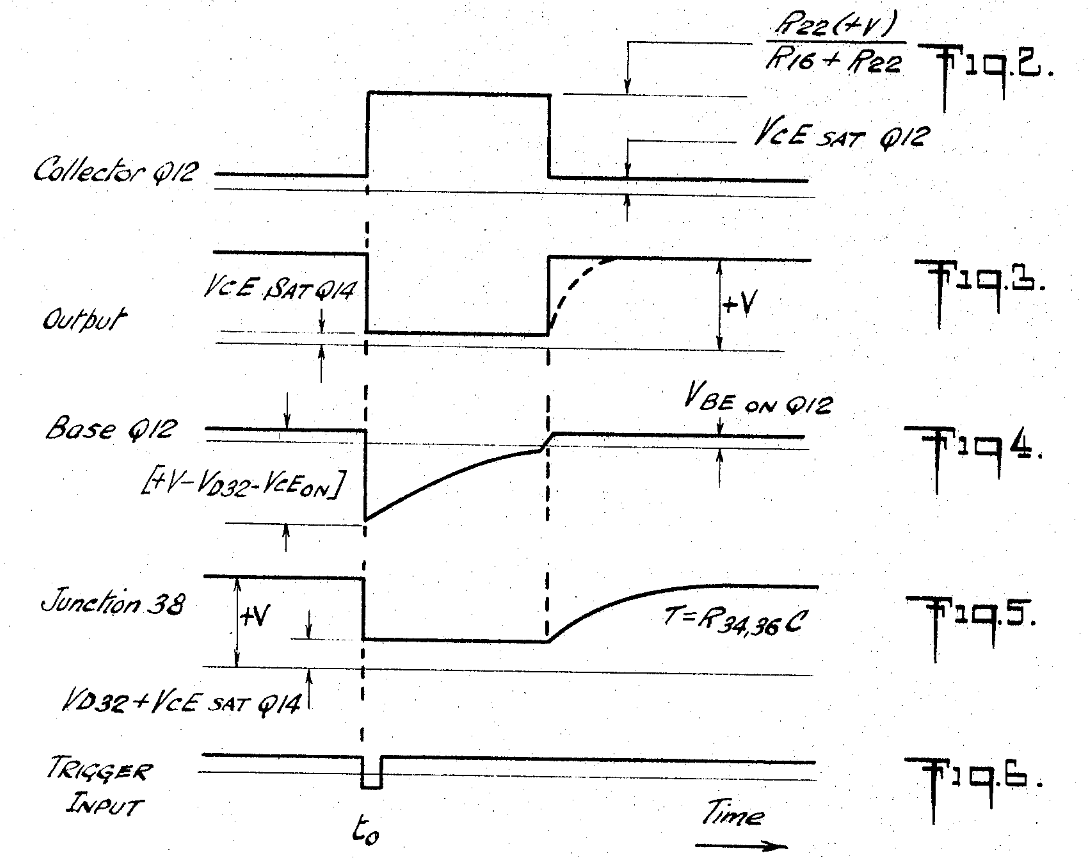

The operation of the circuit shown in FIG. 1 is graphically illustrated in FIGS. 2–6. Transistor 12 normally conducts saturation current and transistor 14 is normally cut off. Prior to time $t_0$ in FIGS. 2–6, the circuit is fully recovered from a prior trigger pulse. The collector potential of transistor 12 is equal collector-emitter saturation potential, shown in FIG. 2. Since transistor 14 is cut off and no current flows through collector resistor 18, the output terminal is at +V, shown in FIG. 3. The base of transistor 12 is at a potential equal to the base-emitter voltage drop in transistor 12, shown in FIG. 4. Junction 38 is at +V since capacitor 26 is fully charged. When a trigger pulse arrives at time $t_0$, transistor 12 is cut off and its collector rises toward +V but is clamped at essentially $$R22\ (+V)/R16+R22$$

as shown in FIG. 2, when transistor 14 conducts. The output potential falls from +V to the collector-emitter voltage drop at saturation in transistor 14. The potential at junction 38 falls from +V to a potential equal to the sum of the voltage drop across diode 32 plus the collector-emitter voltage of transistor 14 and this change in potential is coupled to the side of capacitor 26 joined to the base of transistor 12. Diode 30 isolates the trigger pulse source as the base potential drops below the trigger pulse potential. Capacitor 26 begins to charge through a charging circuit including resistor 20, diode 32 and the collector-emitter of transistor 14 and continues to charge until the potential of the left hand side of capacitor 26 and thus of the base of transistor 12 rises above cutoff at which instant the potential at the base of transistor 12 steps to the base emitter potential. Transistor 14 is cut off in coincidence with transistor 12 being rendered conductive. Diode 32 decouples capacitor 26 from the collector resistor 18 and the output potential rise steeply to +V. At the same instant that transistor 12 becomes conductive and the output voltage rises to +V, charging current for capacitor 26 then begins to flow through the resistors 34, 36 and the base-emitter of transistor 12 and continues until junction 38 returns to +V.

Diode 32 and resistors 34 and 36 operate to produce an extremely rapid rise at the trailing edge of the output pulse. In the absence of diode 32 and resistors 34 and 36, the trailing edge of the output pulse is shown in broken lines in FIG. 3. The value of resistors 34 and 36 is not critical, but it is recommended that the sum equal or exceed the value of collector resistor 18. If the value of resistors 34 and 36 is made large (e.g. 10–100 times resistor 18), the maximum triggering repetition rate is reduced and the recovery of the trailing edge of the waveform shown in FIG. 5 is slowed; if the value is reduced (e.g. below resistor 18), the load on transistor 14 is increased. The value of resistors 34 and 36 may equal about one to five times the value of collector resistor 18 for most purposes. Resistor 34 is selected for the lower limit. In the triggered state, there is current flow through resistors 34 and 36 to the collector of 14 and to the base of transistor 12. Since value of resistors 34 and 36 is not critical within broad limits, this resistance lends itself to adjustment for optimized operation with respect to vagaries in each embodiment, external load, maximum triggering repetition rate and the like.

While the embodiment described includes NPN transistors, this invention is not limited thereto and may be practiced with PNP transistors or vacumm tubes.

It will be understood that various changes in the details, materials and arrangements of parts (and steps), which have been herein described and illustrated in order to explain the nature of the invention, may be made by those skilled in the art within the principle and scope of the invention as expressed in the appended claim.

I claim:

A monostable multivibrator consisting of:

a pair of transistors having their emitters connected in common for connection to the negative terminal of a direct current source of collector-emitter voltage, a pair of collector resistors connected in common at one of their ends for connection to the positive terminal of the source of collector-emitter voltage, and to the respective collectors at their other ends, a base resistor connected at one end to the base of one transistor and at the other end to the common connection of the pair of collector resistors, a resistor connected between the collector of said one transistor and the base of the other transistor, a diode connected at its cathode end to the collector of the other transistor, a variable resistance connected between the anode of the diode and the common connection of the collector resistors, a capacitor connected between the anode of said diode and the base of said one transistor, a bias resistor connected at one end to the base of the other transistor, for connection at its other end to a source of negative bias to normally cut off said other transistor, and a diode connected at its anode end to the base of said one transistor and for connection at its cathode end to a source of negative trigger pulses for cutting off said one resistor, whereby a pluse having a sharp trailing edge and having its leading edge coincident with the leading edge of the corresponding negative trigger pulse is provided at the collector of said other transistor.

References Cited by the Examiner

UNITED STATES PATENTS

| | | | |
|---|---|---|---|
| 2,976,432 | 3/1961 | Geckle | 307—88.5 |
| 3,021,435 | 2/1962 | Keiper | 307—88.5 |
| 3,108,196 | 10/1963 | Colao | 307—88.5 |
| 3,153,196 | 10/1964 | McGuire | 307—88.5 |
| 3,227,891 | 1/1966 | Ashcraft | 307—88.5 |

ARTHUR GAUSS, *Primary Examiner.*

J. JORDAN *Assistant Examiner.*